Nov. 2, 1965   N. LAWYER   3,215,792
IMPACT OPERATED SWITCH
Filed Aug. 30, 1962   3 Sheets-Sheet 1

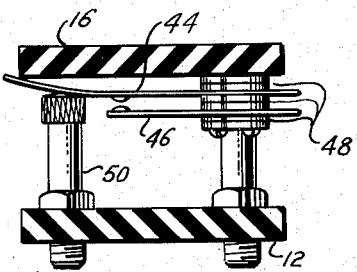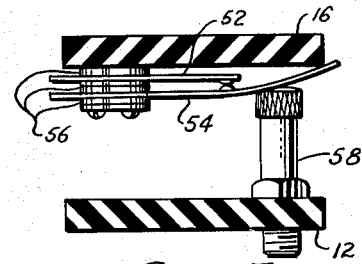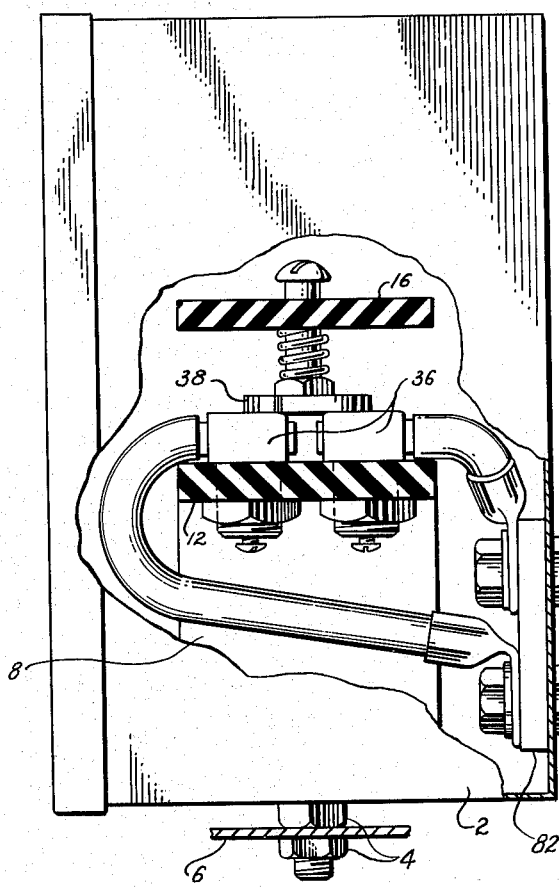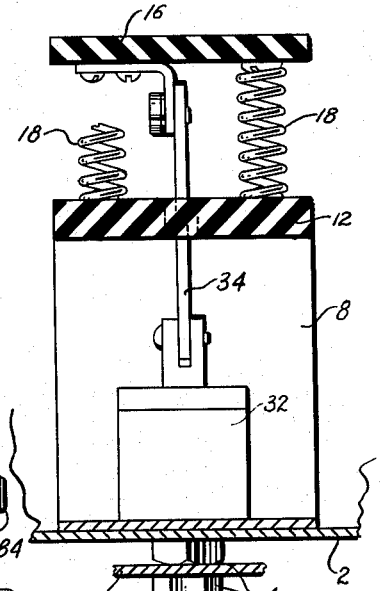

United States Patent Office 3,215,792
Patented Nov. 2, 1965

3,215,792
IMPACT OPERATED SWITCH
Noah Lawyer, 45 Lehigh Ave., Rochester, N.Y.
Filed Aug. 30, 1962, Ser. No. 220,382
3 Claims. (Cl. 200—61.5)

The invention described herein relates to the electrical systems used in motor vehicles, and more particularly to the opening of the major electrical circuits of a motor vehicle as a safety feature when the vehicle is not in use or in the event of a collision.

Automotive fires are often the result of short-circuits in the electrical systems of motor vehicles. With presently existing automotive electrical systems, short-circuits can result following a collision, or on other occasions, even though a vehicle's ignition switch has been turned to its "off" position. The invention herein minimizes the possibility of such fires by isolating the vehicle's battery from the vehicle's major electrical circuits whenever the ignition switch is placed in the "off" position, or in the event of collision.

An object of the invention is the provision of a generally improved and more satisfactory safety circuit for automotive vehicles.

Another object is the provision of means for isolating a vehicle's battery from its major electrical circuits whenever the vehicle is not in use.

Still another object is the provision of a generally improved and more satisfactory impact operated collision switch for motor vehicles.

A further object is the provision of a system for isolating a vehicle's battery from its major electrical systems in the event of a collision.

A still further object of the invention is to provide a safety switch and circuit for motor vehicles which requires only a minimum amount of power for its operation.

Another object of the invention is to provide a simple circuit safety switch system which can be incorporated into existing automotive electrical circuits.

Still another object is to provide means for opening a motor vehicle's spark-production circuit immediately in the event of a collision.

A further object is the provision of means for minimizing the possibility of undesirable drainage on automotive batteries when vehicles are not in use.

A still further object of the invention is to provide means for visually indicating a potentially dangerous short circuit in a motor vehicle's electrical system.

These and other desirable objects may be attained in the manner disclosed as an illustrative embodiment of the invention in the following description and in the accompanying drawings forming a part hereof, in which:

FIG. 1 is a vertical longitudinal cross section through a housing containing the emergency control switch and impact operated switch constructed according to the present invention with portions broken away and other portions shown in elevation to illustrate details of construction showing how the safety control features provided by the present invention may be mounted in a suitable casing in a suitable location on an automobile and connected into the electrical circuits of the motor vehicle.

FIG. 2 is a vertical transverse cross section taken approximately on the line 2—2 of FIGURE 1 showing details of construction of one of the pairs of contact members.

FIG. 3 is a vertical transverse cross section taken approximately on the line 3—3 of FIG. 1 illustrating the details of construction of another pair of contact members.

FIG. 4 is a vertical transverse cross section taken approximately on the line 4—4 of FIG. 1 illustrating details of construction of the contact blocks and plate for use in connecting one terminal of the battery to the motor vehicle ground.

FIG. 5 is a vertical transverse cross section taken approximately on the line 5—5 of FIG. 1 illustrating the solenoid and link construction for moving the movable plate into a closed position and the springs normally operating to move the movable plate into open position.

Figure 1:
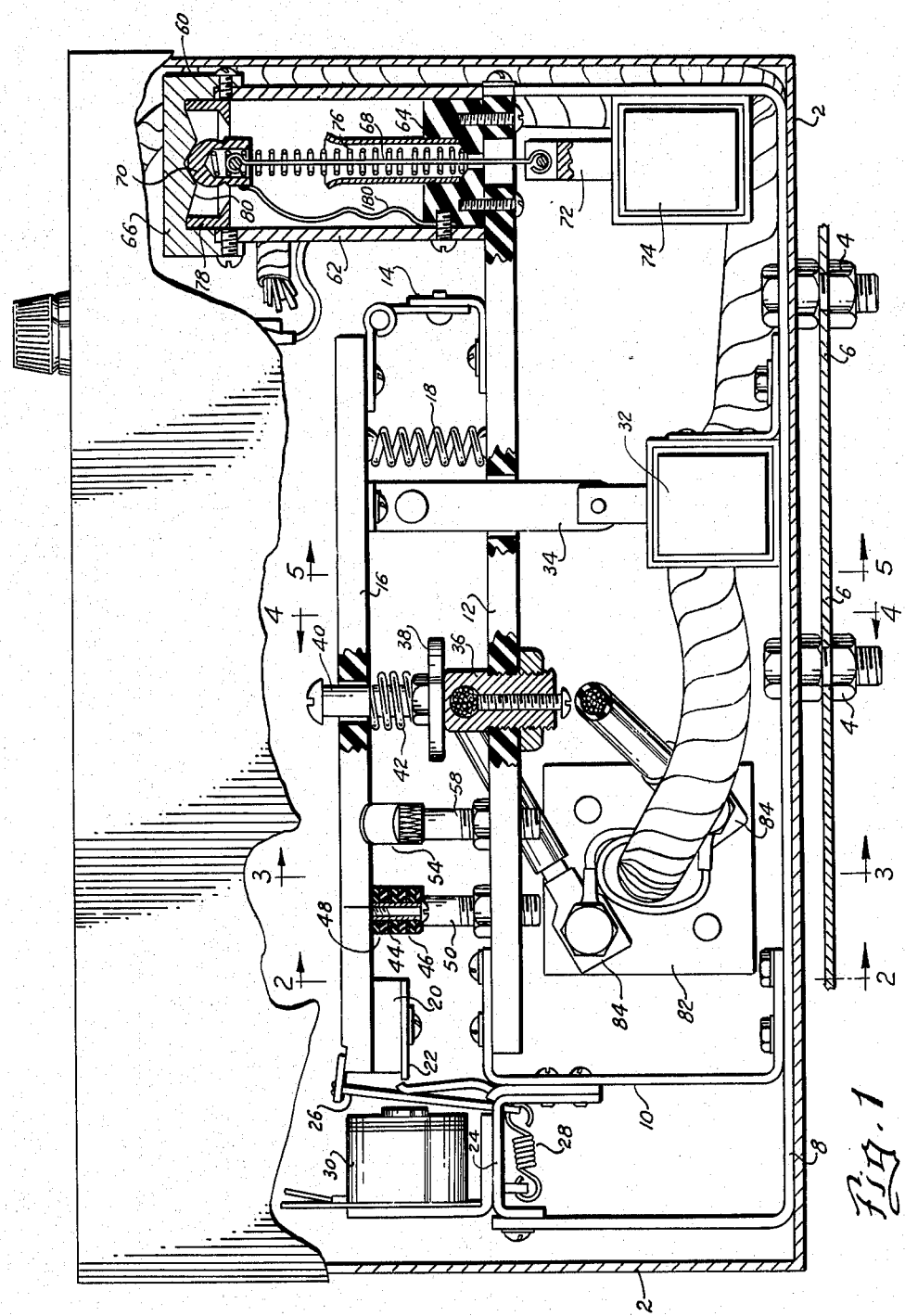

The apparatus provided by the present invention may be assembled in a suitable housing 2 as illustrated in FIG. 1, which may be detachably mounted by means of suitable bolts and nuts indicated at 4 on the dash plate 6 of a motor vehicle located at the rear of the engine compartment. A suitable supporting frame 8 of U-shape has a bottom portion secured to the bottom of housing 2 by means of the bolt and nut connection 4. A base plate supporting bracket 10 is mounted on the bottom portion of supporting frame 8 and spaced inwardly a slight distance from one end thereof as shown in FIG. 1. The base plate 12 is formed of suitable insulating material of rectangular shape with opposite ends secured to one end of the supporting frame 8 and the base plate supporting bracket 10 in spaced parallel relation to the bottom portion of the supporting frame 8, as shown in FIG. 1.

A supporting bracket 14 is formed with an angularly extending foot portion secured to the upper face of the base plate 12 by suitable screws or the like, and has a hinge member on the opposite end adjustably mounted thereon so that the position of the hinge relative to the base plate 12 may be adjusted to move it closer or farther away from the base plate. The hinge portion of supporting bracket 14 has one terminal portion of the movable plate 16 secured thereto for hinging movement toward and from the base plate 12 about the hinge portion of the supporting bracket 14, as clearly shown in FIG. 1. A pair of compression springs 18 are mounted to extend between opposite portions of the movable plate 16 and the base plate 12, are arranged in a plane extending transversely to the longitudinal dimension of the plates 12 and 16 and have the opposite ends secured by screws or the like to the plates 16 and 12 respectively. These compression springs 18 normally operate to move the movable plate 16 away from the base plate 12 to disengage the several contacts in a manner that will be hereinafter described. The free end of the movable plate 16 carries a block 20 mounted on the side facing the base plate 12 and has the stop bar 22 mounted on the other side thereof with one end of the bar projecting outwardly beyond the end of the movable plate 16, as shown in FIG. 1.

A connecting strip 24 is secured to the base plate supporting bracket 10 at the outer end thereof and to the outer adjacent end of the supporting frame 8, as shown in FIG. 1, to provide a support in substantially coplanar relation with the base plate 12 beyond one end thereof. The support provided by the connecting strip 24 carries a pivoted latch 26 having an angularly extending end portion for engaging over the outer surface of the free terminal portion of the movable plate 16, as shown in FIG. 1. The opposite end of latch 26 is pivotally secured to the connecting strip 24 with a portion projecting on the opposite side of the connecting strip 24 for mounting the tension spring 28 at one end. The opposite end of the spring 28 is connected to a portion of the connecting strip 24 for normally moving the latch 26 to have the end thereof engaged over and hold the movable plate 16 in closed position. When the latch is moved to disengage the end of the movable plate 16, the compression springs 18 will move the free end of the plate outwardly on the hinge mounting on the bracket 14 until the end of the pivoted latch 26 engages the projecting portion of the stop bar 22 for limiting the movement of the movable plate in open position.

A latch solenoid 30 carried by a suitable bracket is mounted on the connecting strip 24 as shown in FIG. 1, adjacent to the pivoted latch 26 for magnetically moving the latch 26 on its pivot against the tension of the spring 28 for disengaging the movable plate 16 so that it may move into its open position from the closed position shown in FIG. 1. A plate solenoid 32 is carried by a bracket mounted on the bottom portion of the supporting frame 8 below the base plate 12 near the central portion thereof and has an armature provided with a link connection 34 extending through an aperture in the base plate 12 with the upper end of the link connection 34 pivotally attached to the movable plate 16. When the plate solenoid 32 is energized it will operate the armature and the link connection 34 to move the movable plate 16 from the open position into the closed position until the pivoted latch 26 engages over the outer end for retaining the movable plate in the closed position, as shown in FIG. 1.

The central portion of the base plate 12 carries a pair of contact blocks 36 mounted on the upper face thereof as shown in FIGS. 1 and 4, in transversely alined relation and slightly spaced from one another. The contact blocks 36 have threaded bolts projecting through apertures in the base plate 12 for receiving suitable nuts on the under side of the base plate for firmly securing the contact blocks to the base plate so they will project outwardly from the base plate 12 toward the movable plate 16. The contact plate 38 is mounted on the end of a screw 40 slidably engaged in an aperture in the movable plate 16 in alined relation to the contact blocks 36 so that the plate 38 may be moved to engage the outer surfaces of both contact blocks. The screw 40 has a head on the outer side of the movable plate 16 for limiting the movement of the contact plate 38 away from the plate 16. A compression spring 42 is mounted about the screw 40 between the movable plate 16 and the contact plate 38 for moving the contact plate away from the movable plate until the head on the screw engages the movable plate. The contact plate 38 engages the contact blocks 36 with the spring 42 being compressed when the movable plate 16 is moved into closed position so the contact plate will be held under spring pressure in firm engagement with the contact blocks 36 while the movable plate 16 is retained by the latch 26 in closed position. This insures a constant electrical contact and circuit through the contact plate between the contact blocks 36 and the circuit connected thereto for carrying the current required by the engine starter motor.

The movable plate 16 carries a pair of contacts 44 and 46 arranged in substantially parallel relation and has corresponding ends mounted between insulating blocks indicated at 48 rigidly secured to the movable plate 16 adjacent to the contact plate 38 as shown in FIGS. 1 and 2 with the contacts 44 and 46 extending in transverse spaced substantially parallel relation to the movable plate. The contact 44 is longer than the contact 46 and the pair of contacts carry contact points on the free end portions which are normally engaged to close the circuit controlled thereby. A contact operating post 50 is adjustably mounted on one side portion of the base plate 12 and projects toward the movable plate 16 in alined relation with the outer end portion of the contact strip 44 so that the free end of the post 50 will engage the contact strip 44 and flex it away from the contact strip 46 to disengage the contacts carried thereby and open the circuit through the pair of contacts when the movable plate is latched in the closed position. When the movable plate is released so that it moves into the open position, the contact strips 44 and 46 will operate to engage the contacts and close the circuit controlled thereby in a manner that will be hereinafter described.

Figure 6:
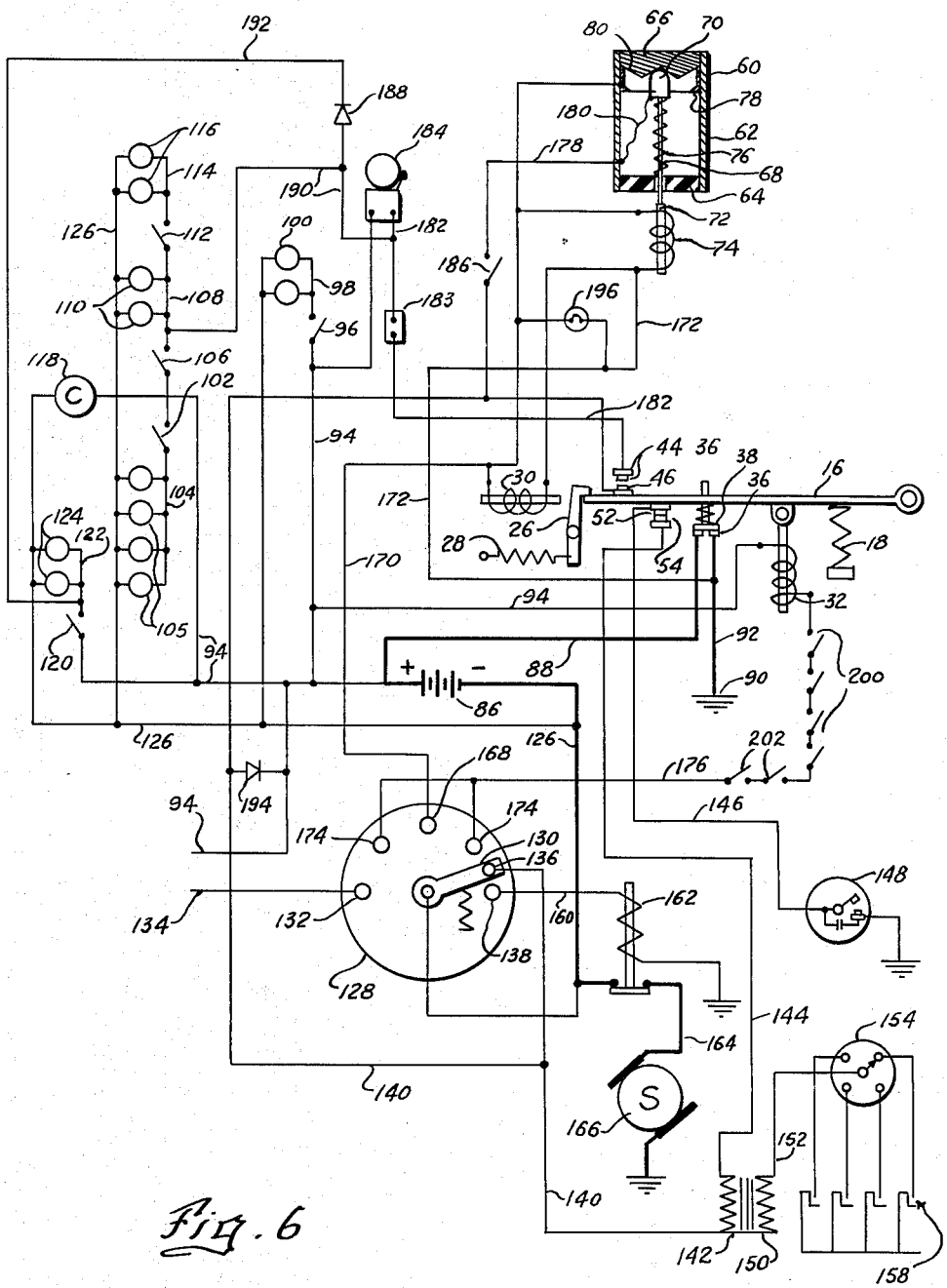
FIG. 6 is a wiring diagram showing portions of the electrical system of a motor vehicle and the electrical connections of the emergency control switch and impact operated switch and associated electrically operated components for securing operation thereof in accordance with the invention.

Another pair of contact strips are indicated at 52 and 54 respectively, which are suitably mounted between insulating blocks 56 on one side of the movable plate 16 in spaced substantially parallel relation. The pair of contact strips 52 and 54 carry contacts in alined relation adjacent the free end of the contact strip 52 which are normally disengaged when the movable plate 16 is in the open position for opening the circuit controlled thereby. The contact strip 54 is longer than the contact strip 52 so the outer end will extend to the opposite side of the movable plate. These contact strips 52 and 54 are located on the side of the movable plate 16 facing the base plate 12 as clearly shown in FIGS. 1 and 3. The contact operating post 58 is adjustably mounted on one side of the base plate 12, as shown in FIG. 3, so the outer end will project toward the movable plate 16 in alined relation with the outer free end of the contact strip 54. When the movable plate 16 is latched in the closed position, as shown in FIGS. 1 and 3, the contact operating post 58 will engage the outer free end of the contact strip 54 and move the contact carried thereby into engagement with the contact on the strip 52 for closing the circuit and holding the circuit controlled by these contacts closed while the movable plate is latched in the closed position. The circuits controlled by these pairs of contacts will be described in connection with the wiring diagram, as shown in FIG. 6.

The above described construction is for the emergency control switch assembly made according to the present invention. The invention also provides for an impact operated switch in the form of an assembled unit indicated by the numeral 60 mounted on the end portion of base plate 12 adjacent to the supporting bracket 14, as shown in FIG. 1. The impact operated switch 60 has a cylindrical casing 62 with the end members 64 and 66 each mounted on opposite ends thereof. Suitable means such as screws or the like detachably secure the end members to the casing 62. The end member 64 is formed with a central passage for slidably receiving the flexible wire contact support 68. One end of the contact support 68 extends toward the end member 66 and detachably mounts a movable contact member 70, while the opposite end slidably engages in the end member 64 and projects outwardly through an aperture in the base plate 12 for attachment to the armature 72 of the impact switch solenoid 74.

The impact switch solenoid 74 is mounted in a frame rigidly attached to the adjacent leg of the supporting frame 8, as clearly shown in FIG. 1, so that when the solenoid is energized it will pull the armature 72 into the solenoid and slidably move the contact 70 away from the inner surface of the end member 66 for resetting the movable contact member 70. A compression spring 76 has one end mounted in a socket formed in the end member 64, is engaged about the flexible wire contact support 68, has the lower end slidably engaged in the spring guide sleeve 77 mounted in the socket in the end member 64 and has the opposite end engaged with the movable contact member 70 for normally sliding the wire contact support 68 and the contact member 70 toward the end member 66 to engage the outer rounded end of the contact member 70 in a substantially conical recess formed centrally in the inner surface of the end member 66 facing said end member 64. A cylindrical or annular stationary contact member 78 is mounted in the end member 66 about the inner cylindrical surface thereof and the inner surface of the adjacent portion of the cylindrical casing 62 in transversely alined relation with the movable contact 70. Whenever the movable contact 70 is forced to move out of its central position in the cylindrical casing toward the sides thereof in any direction it will engage the stationary contact 78 whenever it moves outwardly to a sufficient extent and will close a circuit controlled thereby which will be hereinafter described.

The inner surface of the end member 66 is formed with a ridge or inwardly projecting portion 80 providing a central recess and an annular outer recess in the end member 66 as shown in FIG. 1. When the movable contact member 70 is caused to move by an impact applied to the casing in an outward direction toward the casing 62 the outer surface thereof will move along the inner surface of the end member 66 and slide over the ridge 80 into the annular recess for engagement with the cylindrical contact 78. The compression spring 76 will operate to provide for the movement of the contact member 70 along the inner surface of the end member 66 from the recess inside the ridge portion 80 to the annular recess on the outside of the ridge portion 80 and retain the movable contact member 70 in engagement with the stationary contact member 78 for closing the circuit controlled thereby.

An insulating block 82 is mounted in an aperture formed in one side wall of the housing 2 as shown in FIGS. 1 and 4 and is formed with a central aperture for the passage of electric wires from the inside of the housing to the various electrical equipment on the motor vehicle so the two switches in the housing 2 may be connected in the circuits in a manner that will be described. The contact blocks 36 have heavy cable connections to the bolts 84 mounted on opposite corner portions for transmitting the high current requirements of the starter. Two heavy cable members 85 and 87 respectively, are mounted inside the housing 2 for connecting the contact bolts 84 to the contact blocks 36 as shown in FIGS. 1 and 2. Set screws are threaded in the contact blocks 36 to retain the ends of the cables connected in bores formed in the contact blocks. These bolts 84 provide a means for connecting heavy cables to the ends of the bolts on the inside and the outside of the housing 2 in a convenient manner for connecting the contact blocks 36 in circuit with the motor vehicle electrical system in a manner that will now be described in connection with the wiring diagram shown in FIG. 6.

The motor vehicle battery is shown in the wiring diagram FIG. 6, at 86. The positive terminal of the battery 86 is connected by one of the heavy cables indicated in FIG. 6 at 88 through one of the bolts 84 to one of the contact blocks 36. The other contact block 36 is connected by a heavy cable through the other bolt 84 to the motor vehicle ground indicated at 90 by the heavy cable connection 92. The contact plate 38 engages the contact blocks 36 when the movable plate 16 is in the closed position, to close the circuit from the battery to the motor vehicle ground 90 and thereby provide a closed circuit for the normal operation of the motor vehicle and its electrical equipment.

The positive terminal of the battery 86 has electric conductor 94 connected to the courtesy lights 100. The other terminals of the courtesy lights 100 have a wire 98 connecting them to the courtesy light switch 96. These courtesy lights are the ones usually lighted for illuminating the inside of the vehicle body when the doors are opened. The conductor 94 is also connected to one terminal of the parking and taillight switch 102. The switch 102 has a conductor 104 connecting it to the several parking and taillights indicated at 105. The conductor 94 also has a connection with the headlight switch 106. The switch 106 has an electrical connection 108 with the low beam headlights 110 and the high beam switch 112. The high beam switch 112 has a conductor 114 connecting it to the high beam headlights 116. The conductor 94 is connected to one terminal of the electric clock 118. The conductor 94 has another connection with the stop light switch 120. The stop light switch 120 has conductor 122 connecting it to the stop lights 124.

A conductor 126 connected to the negative terminal of the battery 86 provides an electrical connection with the courtesy lights 100, the parking and taillights 105, the low beam headlights 110, the high beam headlights 116, the clock 118, and the stop lights 124. The courtesy lights, parking and taillights, headlights, clock and stop lights in the conventional motor vehicle electrical system usually have one contact connected to the motor vehicle ground. According to the present invention these lights and the clock are insulated from ground and have the conductor 126 provided with a plurality of connections to the several lights and the clock as above described so that the clock and light circuits from the battery are connected through insulated electric wiring to eliminate the usual ground connection. This forms a special feature of the present invention in connection with the impact control switch and the emergency control switch.

The usual key operated motor vehicle ignition switch is indicated at 128 in FIG. 6. It has the conventional switch arm 130 rotatable to engage one of a plurality of selected contacts in the usual manner. The ignition switch 128 has the switch arm 130 connected to the conductor 126 and the negative terminal of the battery 86. The ignition switch 128 has the contact 132 engaged by the switch arm 130 when the motor vehicle is not operating in order to close the circuit through the conductor 134 to the accessories, such as a radio, on the motor vehicle which it is desired to electrically operate while the vehicle is parked. The conductor 134 is connected to one terminal of the accessories while the opposite terminal is connected to the conductor 94 to complete a wired circuit to the opposite terminals of the battery insulated from the motor vehicle ground.

The ignition switch 128 has the contact 136 which the switch arm 130 engages to close the usual ignition circuit and the contact 138 closely adjacent to the contact 136 so that the switch arm 130 may engage both contacts in the conventional manner for closing the circuit to the starter solenoid for starting the motor vehicle engine. The ignition contact 136 has the conductor 140 connecting it to the primary 142 of the ignition coil. The opposite terminal of the primary 142 is connected by the conductor 144 to the contact 54 normally engaging the contact 52 when the emergency control switch 16 is in the closed position. The contact 52 has a conductor 146 connecting it to the distributor 148 for establishing a circuit to one of the distributor contacts while the other contact is conneced to the motor vehicle ground as indicated diagrammatically in FIG. 6, in the usual conventional manner.

The distributor 148 diagrammatically indicates the usual make and break type of distributor now conventionally used on most motor vehicle engines. The conductor 140 is also connected to one terminal of the ignition coil secondary 150 having the opposite terminal connected by the conductor 152 to the central contact on the distributor cap 154. The distributor cap has a plurality of circumferentially arranged contacts constructed in the usual conventional manner, each having electrical connections with the individual spark plugs indicated diagrammatically at 158, four being shown in FIG. 6.

It is well known in the art that the distributor has separate wire connections with each spark plug from one of the circumferential contacts 156, the number of spark plugs and the number of contacts corresponding to the number of cylinders in the usual internal combustion engine used in motor vehicles. While four are illustrated diagrammatically in FIG. 6, it is to be understood that the illustration is merely diagrammatic and that the invention may be used on motor vehicles having any number of cylinders in the motor vehicle engine or for any other type of engine other than the usual internal combustion engine which may be used as a substitute for the conventional engines now in current use.

When it is desired to start the usual motor vehicle engine it is customary on many motor vehicles to use the key operated ignition switch 128 so the contact arm of the switch indicated at 130 may be moved to close the contact to the starter solenoid while maintaining the ignition circuit closed through the ignition contact 136. The present diagrammatic illustration in FIG. 6 shows this type of an electrical system for motor vehicles in which the starter contact 138 has a conductor 160 connecting it to the starter solenoid 162 which has the other contact connected to the motor vehicle ground in the usual manner. When the solenoid 160 is energized it operates a contact bar to close the circuit from the negative terminal of the battery 86 through the conductor 126, the solenoid contacts and the conductor 164 to one terminal of the starter motor 166 having the other terminal connected to the motor vehicle ground in the usual manner.

The description of the wiring diagram in FIG. 6 and these various parts and connections of the electrical equipment used on a motor vehicle are merely for the purpose of illustrating how the invention is electrically connected with the usual conventional motor vehicle electrical system whether it contains exactly the same equipment and circuit connections illustrated or is somewhat differently connected in one of the several conventional ways now in current use. As above pointed out, a special feature of the present invention is the separate return electrical connections 126 for the electrical equipment on the motor vehicle from the normal grounded return circuit.

The conventional wiring circuits to the courtesy lights, clock, parking and taillights, headlights, stop lights, and electrically operated accessories on different models and makes of automobiles and the positions of the several switches controlling the circuits will be slightly different from one another and the arrangement shown in the wiring diagram in FIG. 6. The circuits shown in FIG. 6 illustrate how the present invention is applied to the conventional motor vehicle circuit arrangement and connected in circuit therewith in a manner that illustrates the application of the invention to a typical conventional automotive circuit without showing the variations in different makes and models since it will be clear from the illustration and description how to apply the invention to all conventional circuits.

When the emergency control switch is closed as above described with the movable plate held in the closed position by the latch 26 the battery circuit to the motor vehicle ground is closed through the contact blocks 36 and the contact plate 38 and the ignition circuit from the primary 142 is closed through the closed pair of contacts 52 and 54. In this way the emergency control switch as shown in FIGS. 1–5 and diagrammatically illustrated in FIG. 6 controls the automotive ignition circuit and all of the other circuits which have a grounded return connection.

Remote control means are provided for operating the pivoted latch 26 to release the movable plate 16 of the switch so that it may move to open position and open the circuit to the motor vehicle ground and the ignition circuit of the motor vehicle. This disconnects the grounded circuits of the electrical system of the motor vehicle whenever the movable plate 16 is released by latch 26 and moves to the open position. A remote control is also provided for moving the movable plate 16 into closed position. For this purpose, the usual conventional ignition switch 128 has three additional contacts added to the switch so that the control circuits may be closed in the operation of a key operated switch arm 130. When the motor vehicle ignition switch is in the open position, the movable contact arm 130 will engage the stationary contact 168. This will close the circuit from the negative terminal of the battery 86 through the conductor 126 to the movable switch arm 130 and the stationary "off" contact 168 of the ignition switch to the conductor 170. The conductor 170 has a connection with one terminal of the latch solenoid 30, one terminal of the impact switch solenoid 74 and the cylindrical stationary contact member 78 of the impact switch 60.

The opposite terminal of the latch solenoid 30 and the impact switch solenoid 74 are connected by the conductor 172 to one of the terminals of the cable 92 connected with the motor vehicle ground and one of the contact blocks 36 to establish a circuit through the contact blocks 36, the contact plate 38 and the conductor 88 to the other terminal of the battery 86. When this circuit is closed by moving the ignition switch arm 130 to the "off" position engaging the "off" position contact 168, the solenoids 30 and 74 will be energized. When solenoid 30 is energized it moves pivoted latch 26 toward the solenoid to disengage the free end from the movable plate 16 which will be moved to the open position by the springs 18. The free end of the latch will engage the stop bar 22 in the open position and limit the movement of the movable plate 16 in the open position by the springs 18. This will disengage the contact plate 38 from the contact blocks 36 and allow the contact strips 52 and 54 to disengage from one another as the movable plate 16 moves away from the free end of the contact operating post 58 so the contact 54 of the pair may move to its normal unflexed open position.

The impact switch solenoid 74 is energized simultaneously with the latch solenoid 30 and will operate the armature to pull flexible wire 68 and the contact 70 downwardly away from the end member 66 so that whenever the contact 70 has been moved by a sudden impact from the central portion of the end member 66 across the ridge 80 to engage the stationary contact 78 and close the circuit thereto, the downward movement of the contact 70 will provide for the spring 76 and the flexibility or resiliency of the wire 68 to return the contact 70 into its central position inside of the ridge 80. This will restore the impact switch 60 to its normal inoperative position ready to be operated again whenever the vehicle has a sudden impact with another object which is transmitted to the impact switch 60.

It will therefore be understood that whenever the ignition switch is turned to the "off" position to stop operation of the motor vehicle engine and while the vehicle is parked, the emergency control switch will be moved to the open position by the movable plate 16 being released by the latch 26. This disconnects the battery from its grounded circuit and opens the circuit to the solenoids 30 and 74. However, with the return connections from the several vehicle lights and the clock through the conductor 126, the usual vehicle lights may be used by closing the respective switches controlling them through the direct wire connection of both terminals of the lights, the clock, etc. with the battery without having a grounded circuit connection.

Two additional contacts 174 are added to the conventional ignition switch on opposite sides of the "off" contact 168. These contacts 174 have a conductor 176 connected to both contacts with the opposite end connected to one terminal of the plate solenoid 32. The opposite terminal of the plate solenoid 32 is connected to the electric conductor 94 for establishing a circuit from the negative side of the battery 86 to the conductor 126, the switch arm 130, one of the contacts 174, the conductor 176; the solenoid 32, and the conductor 94 to the other terminal of the battery. It will be understood that when the ignition switch arm 130 is moved from the open position to close the ignition circuit by engaging the contact 136 or to close the circuit through the contact 132 to the automotive accessories while the motor vehicle is parked, the circuit to the plate solenoid 32 will be closed for energizing this solenoid and moving the movable plate 16 from the open to the closed position. When the movable plate 16 is pulled by the solenoid 32 into the closed position, the spring operated latch 26 will engage over the end of the movable plate 16 and lock it in the closed position. This will reestablish the circuits herein above described to the ignition so that the motor vehicle motor may be started, or during use of the accessory equipment that has the opposite terminals connected to the wires 94 and 134, respectively.

As shown in FIGS. 2 and 6, the normally closed pair of contacts 44 and 46 are held in open position by the contact operating post 50 when the movable plate 16 is latched in the closed position.

The contacts 44 and 46 will always be engaged while the movable plate 16 is in the open position. These contacts control the alarm which will not operate in the normal use of the motor vehicle because when the operator stops the vehicle and opens the ignition circuit to stop the motor, the alarm circuit is held open by moving the switch arm 130 to disengage the contact 136. The alarm circuit extends from the negative terminal of the battery 86 through the conductor 126 to the switch arm 130; the contact 136 of the ignition switch 128; the conductor 140; the closed pair of contacts 44 and 46; the conductor 182; the conventional flasher switch 183 to the alarm 184 and the other terminal of the battery through the conductor 94.

The alarm circuit will only be closed to sound the alarm in an emergency resulting from the operation of the impact operated switch 60. In case of an accident where the impact operated switch 60 has the movable contact 70 engage the stationary contact member 78, the motor vehicle will be operating with the ignition switch having the switch arm 130 engaged with the contact 136 for closing the ignition circuits. Under these circumstances, the movable contact 70 of the impact operated switch 60 has a conductor 178 connected through a flexible connection 180 inside the casing 62 with the contact 136 and the conductor 140 for connection with the negative terminal of the battery 86. The circuit from the contact 70 to the stationary contact 78 of the impact operated switch 60 extends through the conductor 170 to one terminal of each of the solenoids 30 and 74 and from the opposite terminals of these solenoids through the conductor 172, the conductor 92, the contact blocks 36, the contact plate 38 and the conductor 88 to the positive terminal of the battery 86. This circuit energizes the solenoid 30 to operate the latch 26 to release the movable plate 16 for movement into open position. The contacts 44 and 46 will engage when the movable plate 16 reaches open position and close the circuit described above to the alarm 184 for starting and continuing its operation. The alarm will be operated intermittently by the conventional flasher switch 183. Any suitable flasher switch may be used, such as the ones used for intermittently operating automobile turn signals. The alarm signal is stopped by opearting the ignition switch 128 to move the contact arm 130 to the "off" position out of engagement with the contact 136. During this operation the contact 70 is reset into the central disengaged position relative to the stationary contact 78 by the solenoid 74 being energized as described above.

A manually operated and normally closed switch 186 is included in the conductor 178 to open the circuit between the contact 46 and the movable contact 70 of the impact switch 60 for preventing the operation of the emergency control switch in cases where the motor vehicle is driven over rough surfaces that might cause the impact switch 60 to operate to close the circuit to the alarm 184 when it is not desired.

The invention as above described provides for the remote control of the emergency control switch having the movable plate 16 and the several contacts controlled thereby from remote locations through the electric circuits controlling the latch solenoid 30 and the plate solenoid 32. In the embodiment of the invention above described the latch solenoid 30 is energized for moving the pivoted latch 26 into a position for releasing the movable plate 16 whenever the ignition switch arm 130 is moved to the "off" position and whenever the motor vehicle has a sudden impact of a predetermined intensity sufficient to cause the movable contact 70 of the impact switch 60 to engage the cylindrical or stationary contact member 78 while the ignition switch has the arm 130 engaged with the contact 136 during normal operation of the motor vehicle. This provides an efficient control of the electric circuits on the motor vehicle from the battery 86 for disconnecting the battery from the grounded connections with the motor vehicle frame of the usual character in the event of an accident through the operation of the impact switch 60 and also for protecting the motor vehicle when it is parked through causing the emergency control switch to move to open position when the ignition switch is turned to the "off" position. Whenever the impact switch is operated in case of an accident it closes the circuit to the alarm 184 in addition to opening the circuit to the grounded connections on the motor vehicle with a view of preventing short circuits to the ground of the motor vehicle through the battery for preventing fires resulting from short circuits occurring and developing as a result of an accident. The wire return circuits for the lights and other accessories on the motor vehicle provide a means for independently using these lights and accessories while the movable plate 16 of the emergency control switch is in open position.

A rectifier 188 has one terminal connected by the wire 190 to the wire 182 and the wire 108 and the other terminal connected by the wire 192 to the wire 122. These circuit connections operate with the circuit to the stop lights 124 to prevent feedback when the brake is applied to stop the vehicle from causing operation of the alarm 184. The circuit connection to the headlights 110 causes the low beam headlights to flash when the circuit to the alarm 184 is closed so the headlights give an additional signal to indicate an emergency.

A rectifier 194 has opposite terminals connected to the wires 94 and 140 respectively for preventing feedback to the distributor points if an accident occurs while the ignition switch has the movable switch arm 130 in position to engage the accessory circuit contact 132 to close the circuit to the accessories through wires 94 and 134 while the motor vehicle is parked and an accident occurs.

It is further contemplated according to the invention to have a signal lamp 196 included in the circuit through the latch solenoid 30 in parallel with the latch solenoid as shown in FIG. 6. This signal light will be energized to show when the circuit to the latch solenoid is closed and will also indicate a grounded circuit in the wiring when the movable plate 16 is in open position.

A further feature of the invention resides in the fact that car thieves are likely to be frightened because if the contact arm 130 is moved over the contact 174 too fast, the circuit to the alarm will be closed because sufficient time is not allowed for the solenoid 32 to move the plate 16 into closed position. As a result the alarm 184 will sound and the headlights 110, and the stop lights 124 will be flashed on and off by the flasher 183 to give both sound and visual signals. At the same time the circuit to the ignition remains open so the engine of the motor vehicle cannot be started.

The invention provides an additional safety feature by providing a separate set of switches, one for each door, which will prevent starting of the engine until all of the doors are closed. This is illustrated in the wiring diagram FIG. 6. In a motor vehicle having four doors, four switches indicated by the numeral 200 would be used. One switch would be mounted on each door frame similar to the present courtesy lights switches. The switches 200 are connected in series in the wire circuit 176 with the solenoid 32. The circuit to the solenoid 32 cannot be closed until all of the doors are closed. This prevents the solenoid 32 from operating movable plate 16 into the closed latched position until the doors are closed. The ignition circuit through contacts 52 and 54 will remain open thereby preventing starting of the motor.

Where seat belts are used, they will be equipped with switch contacts 202 also connected in series in the wire 176. It will then be necessary to have all seat belts equipped with switches 202 secured together before the ignition circuit can be closed. In this way, this invention provides a further safety feature to protect the occupants of the vehicle.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

The invention claimed is:

1. An impact operated switch, comprising a casing having end members closing each end of said casing, a resilient member having one end slidably mounted at one end of said casing in one of said end members, a movable contact member mounted on the other end of said resilient member, a compression spring engaged between said one end member and said movable contact member for normally maintaining said movable contact member engaged with the other end member, an annular contact member mounted in said casing adjacent said other end member in position to be contacted by said movable contact member, means normally retaining said movable contact member in an intermediate position in the other end of said casing, said contact members being adapted to close an electric circuit when engaged, and means including an electro-magnet having an armature connected to the free end of said resilient member operable to slide said resilient member longitudinally in said casing for resetting said movable contact member after it has engaged said annular contact member into disengaged relation relative thereto, whereby an impact of predetermined character applied to said casing will operate said movable contact to engage said annular contact member.

2. An impact operated switch, comprising a cylindrical casing having end members closing opposite ends of said casing, one end member having its inner side formed with a recess facing the opposite end member, a resilient member having one end slidably engaged in said opposite end member at the opposite end of said casing from said one end member, a movable contact member mounted on the other end of said resilient member, a compression spring engaged about said resilient member and extending between said opposite end member and said movable contact member for normally maintaining said movable contact member engaged in said recess in said one end member, an annular contact member mounted in said one end member in position to be contacted by said movable contact member when the latter is substantially displaced laterally out of said recess, said contact members being adapted to close an electric circuit when engaged with each other, and an electro-magnet mounted adjacent said opposite end member and having an armature operatively connected to said one end of said resilient member and operable upon energization of said electro-magnet to slide said resilient member longitudinally in said casing through said opposite end member for resetting said movable contact member after it has engaged said annular contact member, whereby an impact of predetermined character applied to said casing will operate said movable contact member to move out of said recess to engage said annular contact member.

3. A construction as defined in claim 2, in which said recess in which said movable contact member is normally maintained is formed centrally in said one end member and in which there is an annular recess with frusto-conical sides surrounding said central recess and so formed that when said movable contact member is displaced from said central recess it will engage a frusto-conical portion of said annular recess and the force of said compression spring will push said movable contact member against such frusto-conical portion to tend to displace said movable contact member farther away from said central recess and to keep it in contact with said annular contact member.

References Cited by the Examiner
UNITED STATES PATENTS

| | | | |
|---|---|---|---|
| 2,013,924 | 9/35 | Nolte | 200—61.5 |
| 2,304,608 | 12/42 | Smythe | 307—10 |
| 2,481,176 | 9/49 | Taylor et al. | 307—10 |
| 2,617,907 | 11/52 | Umbarger et al. | 200—87 |
| 2,705,267 | 3/55 | La Roza | 200—61.49 |
| 2,721,237 | 10/55 | Yunker | 200—61.49 |
| 2,938,973 | 5/60 | Swanwick | 200—61.48 |
| 3,023,286 | 2/62 | Bourne et al. | 200—87 |
| 3,049,700 | 8/62 | Du Plooy | 200—61.49 |
| 3,089,007 | 5/63 | Rovin | 200—61.48 |
| 3,097,272 | 7/63 | Hautly | 200—61.49 |

BERNARD A. GILHEANY, *Primary Examiner.*